March 26, 1929.  W. E. GREENE  1,706,780

PISTON RING COMPRESSING SLEEVE

Filed Aug. 15, 1927

INVENTOR

*Whitney E. Greene*

Patented Mar. 26, 1929.

1,706,780

UNITED STATES PATENT OFFICE.

WHITNEY E. GREENE, OF WELLESLEY HILLS, MASSACHUSETTS.

PISTON-RING-COMPRESSING SLEEVE.

Application filed August 15, 1927. Serial No. 213,087.

This invention relates to improvements in piston ring compressing-sleeves as used in internal combustion engine assembly or repair for the purpose of securely holding the piston rings in their places on a piston in order that piston and piston rings may be inserted into the cylinder of the engine. The objects of the improvements are:

First; to provide a means of holding, in one operation, all the rings that may be mounted on the piston;

Second; to provide a simple, adjustable device that will operate on several sizes of pistons;

Third; to provide a strong—yet small device that will not be so cumbersome as to encounter any obstructions while in use,—such as cylinder head bolts, counterweights, crankshaft, etc.; and Fourth, to provide an efficient mechanism which will give excellent service whether used for entering pistons into top flat surfaces of engines or through lower bevelled cylinder bores.

One form of the invention is illustrated in the accompanying drawings, in which

Figure 1:
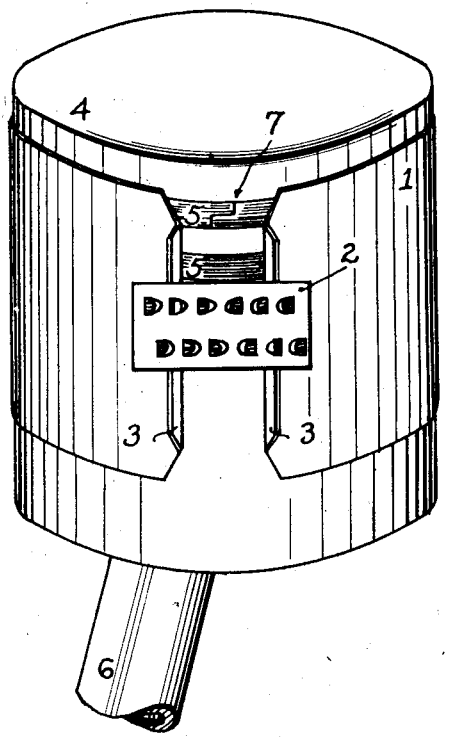
Fig. 1 is a side view of an engine piston showing the relation of the piston, piston rings, and the split compressing-sleeve and clip embodying the invention as used to hold the rings in place.
Figure 2:
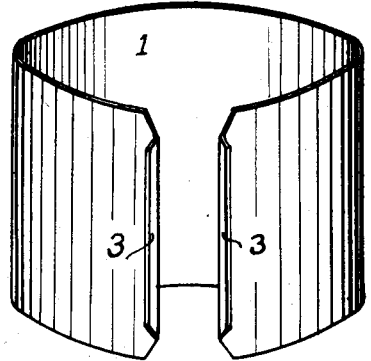
Fig. 2 is a side view of the compressing-sleeve showing how the edges are bent to form flanges 3.
Figure 3:
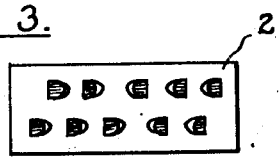
Fig. 3 is a side view of the clip or locking device, showing one manner of construction to give adjustable locking positions by means of half-moon shaped perforations with retaining metal pressed out through the perforations and at an angle.
Figure 4:
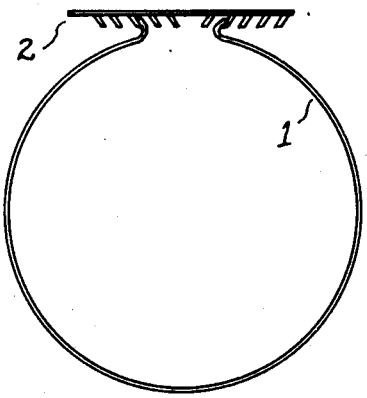
Fig. 4 is a plan view of compressing-sleeve and clip showing how the perforations engage the flanged ends of the compressing-sleeve.

In describing the action of this invention as used on any engine piston for holding the piston rings in position, the piston 4 is indicated in Fig. 1 with piston rings 5 and connecting rod 6. In operation the compressing-sleeve is opened sufficiently to allow it to enclose the piston and rings, around which it is placed. Then, in any suitable manner—preferably with one hand, the compressing-sleeve is squeezed so that flanged edges 3 are drawn together, thereby setting the rings snugly so that the ring joints 7 are closed. This is the desired position of rings and compressing-sleeve for installation of piston into cylinder, therefore, the clip or locking device 2 is adjusted to engage the flanged edges 3 of the compressing-sleeve, thereby holding the compressing-sleeve so that both hands may be removed. Fig. 1 illustrates the result of the above described process. The plan view in Fig. 4 shows how one form of clip is made with multiple points of engagement on the compressing-sleeve crimps. Another form would be the construction of multiple points of engagement on the compressing-sleeve itself with a straight clip flanged at each end. This, however, would be substantially no different in principle from what is herein illustrated and described. Accordingly, it should be understood that this invention is not to be limited to the exact construction shown, for various modifications may be included within the scope of the invention.

I am aware that prior to my invention there have been devices made with various shapes of bands to enclose the piston rings, and these bands compressed in various manners. I, therefore, do not claim such a combination broadly; but

I claim:

1. A piston ring compressing-sleeve comprising a split metallic band having flanged edges in combination with a metallic clip having a series of projections extending in a line at right angles to the edges of the band and adapted to engage with said flanged edges of the band.

2. A piston ring compressing-sleeve comprising a split cylindrical metallic band having outwardly turned flanges at the sides of the split in combination with a removable clip having a series of projections fixed thereto and extending in a line at right angles to the edges of the band and adapted to interlock with the said outwardly turned flanges of the band.

3. A piston ring compressing-sleeve comprising a split cylindrical band in combination with a locking device for the opposed edges of the band, said locking device having a plurality of projections in series and said band having at its opposite side edges portions with which said projections are selectively adapted to interlock, said projections being in series extending in a line at right angles to the edges of the band so disposed that the distance between the opposite edges of the band when locked may be varied at will according to the selected interlocking projections to adapt the sleeve to piston rings of different diameters.

4. A piston ring compressing-sleeve comprising a split resilient band in combination with a locking member for the two opposite side edges of the sleeve, said band and locking member having a plurality of portions which are adapted to interengage to maintain the side edges of the sleeve at their adjusted spacing, the interlocking portions of the band extending in a line at right angles to the edges of the band.

5. A piston ring compressing-sleeve comprising a split resilient band in combination with a separable locking member for the two opposite side edges of the sleeve, said band and locking member having portions which are adapted to interengage to lock the edges of the band in their relative positions, said engaging portions of the locking member being in series in a line at right angles to the engaging edges of the band with which they are adapted to selectively interengage for varying the spacing between the edges of the split band to adapt the band for piston rings of different diameters.

6. A piston ring compressing-member comprising a split resilient cylindrical sleeve in combination with a separable locking member, said sleeve and locking member having a plurality of portions adapted to interlock with each other to maintain the side edges of the sleeve in adjusted spaced relation, said locking portions of the locking member being in spaced series transversely of the line of the split in the sleeve and adapted to interchangeably engage with the locking portions of the sleeve according to the desired diameter of the sleeve when in operative position.

7. A piston ring compressing-sleeve comprising a split cylindrical band of spring metal adapted to embrace a piston ring, said band having flanged edges at the sides of the split, in combination with a clip having a series of inclined projections in a line at an angle to the flanged edges of the band, those which are nearer either end of the series being inclined toward those nearer the opposite end of the series, those which are inclined in one direction being adapted to engage with one of said flanges and the oppositely inclined projections being adapted to engage with the other flange.

In testimony whereof I affix my signature this 11th day of August, 1927, at Wellesley Hills, Massachusetts.

WHITNEY E. GREENE.